FIG. 3

INVENTOR.
EDWARD J. HAZEN
BY
ATTORNEY

May 1, 1956

E. J. HAZEN 2,743,578

TURBOJET ENGINE CONTROL SYSTEM

Filed Nov. 24, 1950

INVENTOR.
EDWARD J. HAZEN
BY
ATTORNEY

May 1, 1956 E. J. HAZEN 2,743,578
TURBOJET ENGINE CONTROL SYSTEM
Filed Nov. 24, 1950 5 Sheets-Sheet 5

INVENTOR.
EDWARD J. HAZEN
BY
*Herbert L. Davis Jr.*
ATTORNEY

United States Patent Office
2,743,578
Patented May 1, 1956

2,743,578

TURBOJET ENGINE CONTROL SYSTEM

Edward J. Hazen, Westwood, N. J., assignor to Bendix Aviation Corporation, Teterboro, N. J., a corporation of Delaware Application November 24, 1950, Serial No. 197,422

20 Claims. (Cl. 60—39.28)

The invention involves improvements in the control system described and claimed in the copending application Serial No. 90,453 filed April 29, 1949 by William E. Brandau and assigned to Bendix Aviation Corporation.

The invention relates to a turbojet engine control system and more particularly to a control system for a multi-stage turbine and supercharger including a pair of speed sensing units and a system in which one of the units senses the driven speed of the rotor of a low pressure first stage supercharger and the other unit senses the driven speed of the rotor of a high pressure second stage supercharger, said speed sensing units serving to maintain the speed of the first stage supercharger within a predetermined maximum limit and the speed of the second stage supercharger at a selected value.

An object of the invention is to provide a control system including a control circuit which, during all steady state operation above operational idle speed, will control the combustion chamber or turbine inlet gas temperature to a selected value and in which at speeds below operational idle speed, the selected temperature control circuit will be disconnected and the speed of the high pressure supercharger will be regulated to a selected value.

Another object of the invention is to provide a control system in which during all speed transients, the selected temperature control circuit will be temporarily blocked out and the speed transient will be governed by both an overriding temperature ceiling and minimum temperature limit.

Another object of the invention is to provide a control system in which a limiting turbine inlet temperature ceiling will be computed by means responsive to ram air temperature and low pressure supercharger speed and utilized so as to override other control circuits to avoid compressor surge conditions.

Another object of the invention is to provide a control system in which a minimum turbine inlet temperature circuit biased by means responsive to high pressure supercharger speed will prevent operation under given speed conditions at turbine inlet temperatures below a scheduled minimum.

Another object of the invention is to provide a control system in which an adjustable absolute maximum turbine inlet temperature ceiling will override all other controls to limit turbine temperature.

Another object of the invention is to provide a control system in which an electrical speed control responsive to the low pressure supercharger speed will limit maximum speed to a preselected value.

Another object of the invention is to provide a control system in which a speed sensitive interlock switch responsive to the speed of the high pressure supercharger will cause the fuel control to remain in cut-off position at all speeds below a preselected value at which engine starting may be effected.

Another object of the invention is to provide a speed control system in which a selected speed signal is biased by a temperature signal slowly cranked in when any error exists between a selected turbine inlet temperature for the selected speed and actual turbine inlet temperature. To accomplish this, two separate signals are selected by a pilot's lever; a speed signal in the main control loop and a temperature signal in a separate servo loop which controls the position of a variable coupling transformer to add to or subtract from the manually selected speed signal so as to correct for variations in the steady state speed temperature setting of the selector signals. In this way, it is possible to accelerate the turbine on a temperature ceiling which is above the final selected steady state temperature, and to decelerate the turbine along a pre-scheduled minimum turbine temperature, as shown graphically in Figure 5.

Another object of the invention is to provide a control system in which overriding controls regulate the fuel flow to the engine to prevent turbine operation above a computed stall or compressor surge limiting temperature or below a scheduled minimum temperature and in which overspeeding is prevented by a separate speed sensing device in the main control loop.

Another object of the invention is to provide a control system including a main control loop in which the following signals may be serially applied: (1) Valve position follow-up; (2) compressor inlet temperature bias; (3) compressor inlet pressure bias; (4) speed selector; (5) high pressure supercharger rotor speed sense; (6) steady state temperature reset; and (7) low pressure supercharger rotor over-speed sense, and in which the speed selector signal and steady state temperature reset signal is balanced by the sum of follow-up, compressor inlet temperature and pressure bias so as to compensate for the changes required in valve position (follow-up) due to variations of compressor inlet conditions; and in which the over-speed signal is normally zero, but increases rapidly for small over-speed values.

Another object of the invention is to provide a valve position follow-up to impart a speed droop with load to the system for stabilization which droop is mostly scheduled out by the compressor inlet temperature and pressure bias signals while the remaining follow-up signal is reset out by a steady state temperature reset so that any unbalanced voltage in the series of signals is amplified to drive a servo valve control motor to correct the fuel flow until a balanced condition does exist.

Another object of the invention is to provide a turbine inlet temperature loop in which such temperature is sensed and the resulting temperature signal amplified and converted to AC in a magnetic amplifier and in which loop circuit there is provided an electronic rate circuit to supply a signal proportional to the rate of change and of a phase dependent upon whether the temperature signal is increasing or decreasing. The sum of these temperature and rate signals is balanced against a manually selected signal so that any error is amplified to control a motor to drive a steady state temperature reset transformer in the main control loop in a direction to correct the error signal.

Another object of the invention is to provide means to limit the maximum rate of change of the reset signal so as to prevent interference between the steady state temperature signal and the higher ceiling temperature desired during acceleration transients. In this way, the turbine is allowed to accelerate on the fixed ceiling or surge ceiling temperature until the selected speed is approached. At that time the selected speed signal will be decreased by the small amount of the temperature reset which has been cranked in during the speed transient and the main loop will be balanced so that the fuel valve control motor motion will be reversed on any further speed increase. If the temperature circuit is not then satisfied, the steady state temperature reset amplifier will effect the control motor so as to continue to slowly drive a variable coupling transformer in the main loop until the correct turbine temperature is achieved. All control constants and reset cranking speeds are adjustable so that the optimum engine performance may be obtained. Stabilization in the steady state temperature loop is accomplished by means of the temperature rate circuit which is adjusted to supply the required amount of anticipation of the response signal.

Another object of the invention is to provide such a control system for operation below operational idle speed, in which a switch mechanically actuated by the pilot's lever disconnects the excitation for the steady state temperature reset transformer and makes the main control loop a straight speed responsive system with no temperature reset.

Another object of the invention is to provide a surge limiting circuit to (1) compute the maximum permissible turbine inlet temperature which may be maintained without compressor surge; (2) compare this computed temperature to the actual temperature and (3) control the fuel valve so as to prevent operation above this temperature without affecting operation at lower temperatures.

The last mentioned surge limiting circuit includes a servo loop which basically balances the output of the computer transformer against a turbine speed responsive transformer whose sinusoidal output voltage is adjusted to match the surge curves. The level of this speed output voltage is shifted to match the level of the actual temperature signal by means of a constant bias voltage device serially connected into the loop. To shift the basic curve vertically on the turbine temperature scale with variations in compressor inlet temperature, another signal obtained from a ram or compressor air inlet temperature responsive transformer and proportional to compressor inlet temperature is added to the servo loop. The displacement of the curves along the speed scale is achieved by a ram or compressor air inlet temperature responsive device for adjusting a second rotor element of the speed sensing transformer. Any unbalanced signal affects through an amplifier an actuator motor to position the rotor of the computer transformer until its output just balances the sum of the speed, compressor temperature, and bias signals. The computer output voltage is then compared with the actual temperature signal and the difference, or error, is mixed with a stabilizing signal (from a follow-up and reset circuit) and put into a phase discriminating circuit. Since over and under temperature error signals are of opposite phases, the discriminator is made to block all under temperature signals so that they have no affect on the main control circuit; but over temperature signals are passed through the discriminator and reach the output stage of the main circuit overriding it and reducing fuel flow until the computed surge temperature is reached. Action of this circuit is instantaneous and will limit temperatures during transient and steady state operation at any position of the pilot's selector lever and at all ambient conditions.

A further object of the invention is to provide a control system in which a fixed maximum turbine inlet temperature ceiling is imposed on the surge curves by simply limiting the maximum adjustment of the rotor of the computer transformer with a mechanical stop to limit the rotor rotation in a maximum temperature increasing direction.

A still further object of the invention is to provide a control system in which minimum turbine temperature is controlled by a means which compares the actual temperature signal with a reference signal and in which the error signal is fed to a phase discriminator, but in this case over temperature signals are blocked and under temperature error signals are passed through to control a motor to open the fuel valve and maintain the turbine inlet temperature above the scheduled minimum turbine inlet operting temperature. The reference signal is obtained from a variable coupling transformer which is positioned proportional to the high pressure supercharger speed. In this way minimum operating temperatures may be varied with unit speed as required.

The above and other objects and features of the invention will appear more fully hereinafter from a consideration of the following description taken in connection with the accompanying drawings wherein one embodiment of the invention is illustrated by way of example.

Turbine jet engine with multistage turbine and supercharger

Figure 1:
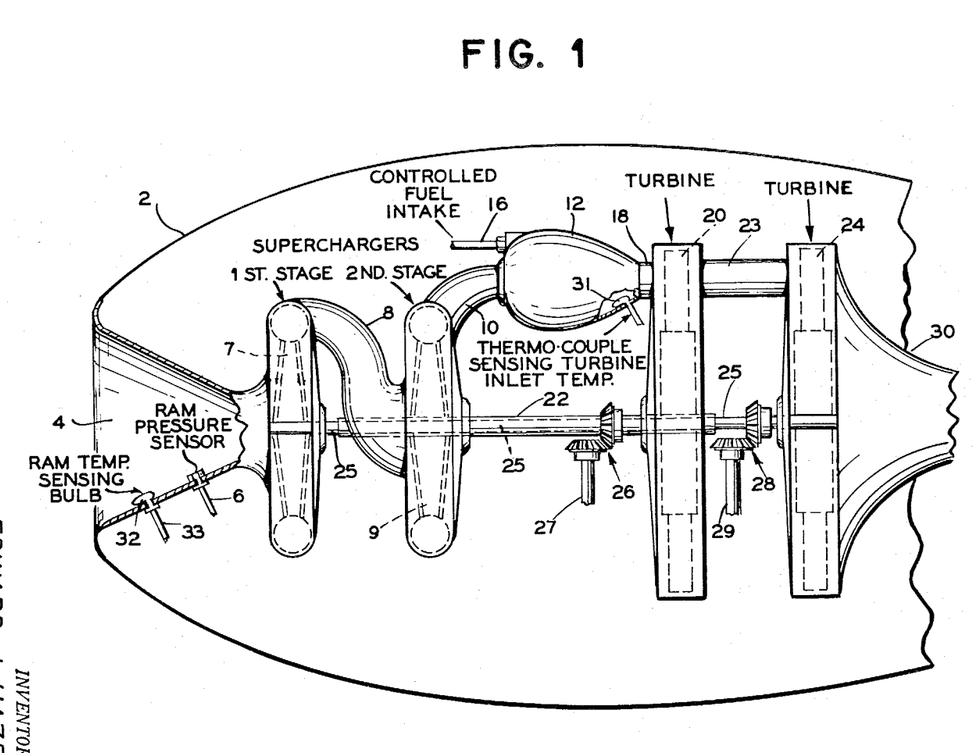
Figure 1 is a diagrammatic view of a turbojet engine including a multi-stage turbine and supercharger and showing the take-offs for the subject controller.

Referring to Figure 1, the engine is mounted within a body 2, e. g., the nacelle of an aircraft which moves toward the left in this figure so that ambient air is rammed into an intake 4 with a pressure take-off 6 opening therefrom for connection to the engine control system or controller. This air is compressed by a first stage compressor or low pressure supercharger 7 and flows through a conduit 8 into a second stage compressor or high pressure supercharger 9 from which the air in turn flows through a conduit 10 into a combustion chamber 12. Fluid fuel at a controlled rate is fed through a line 16 into the combustion chamber 12.

Figure 2:
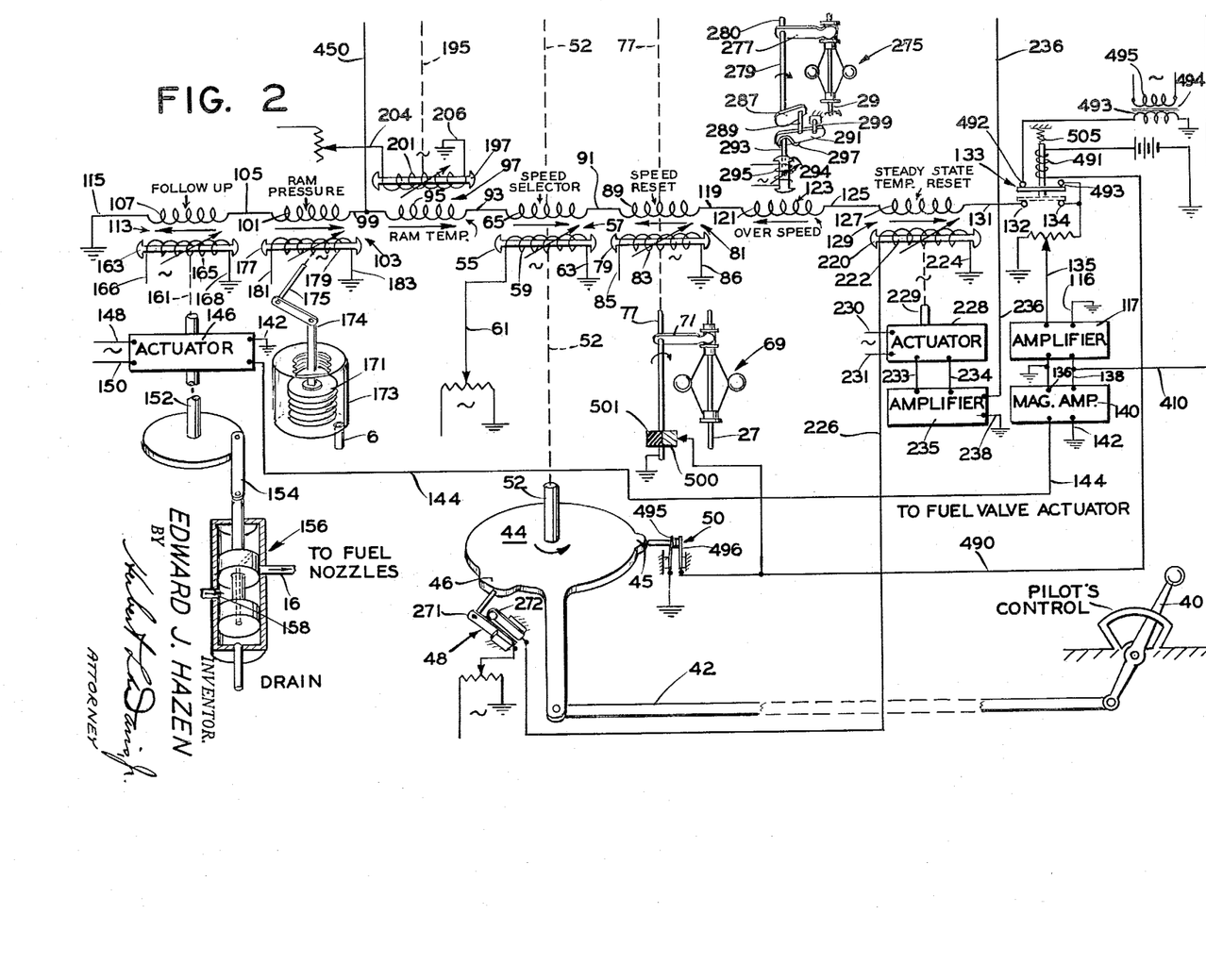
Figure 2 is a schematic diagram of a turbojet engine control system embodying the invention and showing the main control loop therefor.
Figure 3:
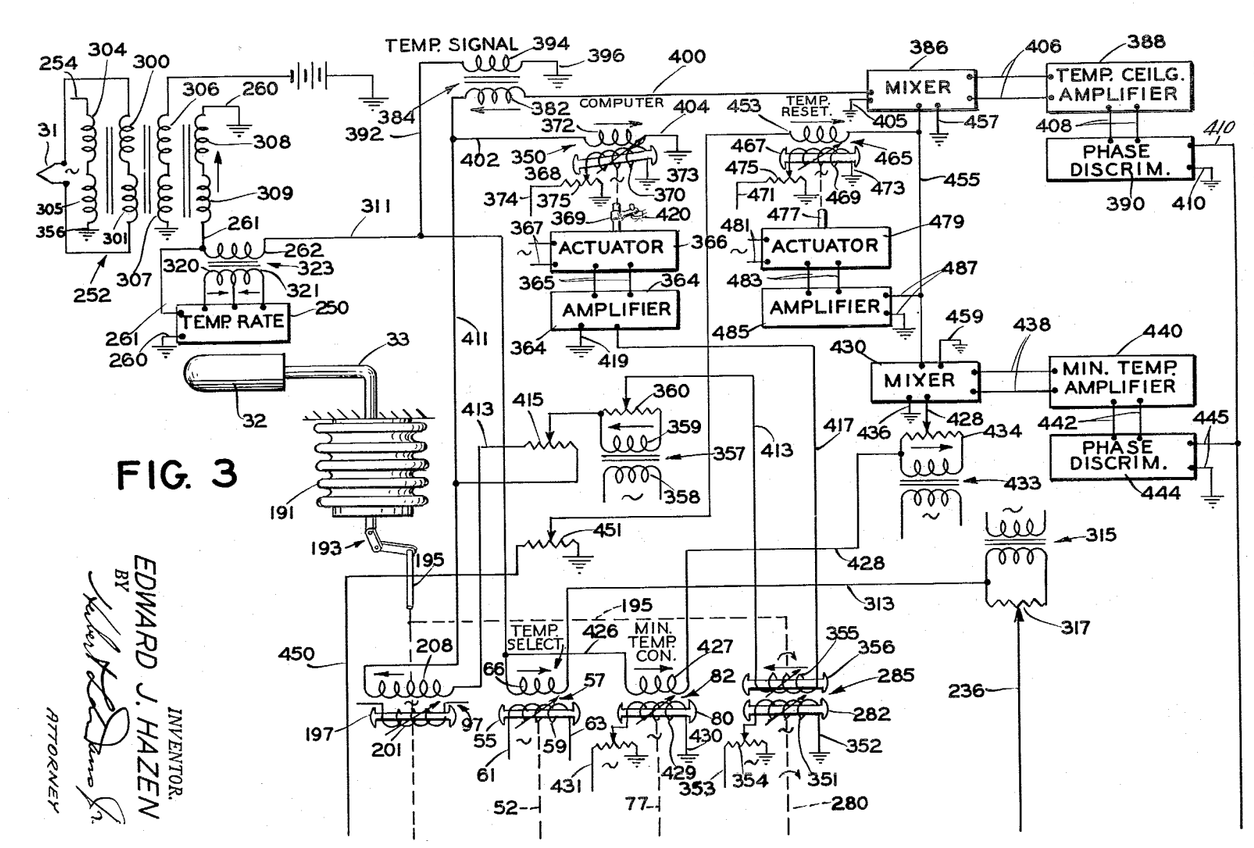
Figure 3 is a schematic diagram of the steady state temperature control loop surge limiter and maximum and minimum temperature control circuits for the main control loop of Figure 2.

Products of combustion flow out through a nozzle 18 to a turbine wheel 20 which drives the second stage compressor 9 through a hollow shaft 22. The products of combustion also flow out through a nozzle 23 to a second turbine wheel 24 which is connected by a shaft 25 which passes through the center of the hollow shaft 22 to the first stage compressor or low pressure supercharger 7. Gearing 26 and a shaft 27 connect the turbine shaft 22 with a speed governor of the control system shown in Figure 2, as hereinafter explained. Gearing 28 and a shaft 29 connects the turbine shaft 25 with a speed governor for the control system as shown in Figures 2 and 3. The turbine exhaust exits through the jet pipe 30.

Mounted in the combustion chamber 12 and sensitive to the turbine inlet temperature of the exhaust gases from the combustion chamber is a thermocouple element 31. The temperature responsive probe or thermocouple 31 may be of a conventional type or of a type such as described and claimed in the U. S. Patent No. 2,483,350, granted September 27, 1949 and assigned to Bendix Aviation Corporation.

A ram temperature bulb 32 which may be of a conventional type and containing a suitable fluid medium responsive to changes in temperature is secured in the intake 4 and connected through a tube 33 to the control system, as hereinafter explained.

From the standpoint of automatic control response lags of the engine tend to produce instability which requires either damping or a rate component for neutralization. Main source of such lags are the inertia of the turbine's rotating parts, time for combustion of fuel, and the time required for air to pass through the engine. On the other hand, the strong regulation of the engine itself strongly assists the controller in maintaining stable control.

*Main control loop*

Referring to the drawing of Figure 2, there is indicated by the numeral 40 a pilot's control lever operably connected through a link 42 to a cam element 44 having cam surfaces 45 and 46 for controlling switch elements 48 and 50, as hereinafter explained. The cam element 44 is affixed to a shaft 52 which is operably connected to a rotor 55 of an inductive transformer 57. The rotor 55 has a winding 59 connected by leads 61 and 63 across a main source of alternating current having a constant frequency. The rotor winding 59 is inductively coupled to a stator winding 65 in the main control loop and to a second stator winding 66 in the temperature control loop in Figure 3 as will be hereinafter explained. The coupling relation between the rotor and stator windings varies with the position of the control lever 40.

Driven by the shaft 27 from the turbine 20 of the second stage supercharger 9 is a fly-ball governor 69 of conventional type which is mechanically connected through a rotary arm 71, and a shaft 77 to rotors 79 and 80 of speed responsive variable coupling transformers 81 and 82, respectively. The rotor 79 has a winding 83 connected by leads 85 and 86 across the main source of alternating current having a constant frequency. The rotor winding 83 is inductively coupled to stator winding 89. The coupling relation between the rotor and stator windings varies with the position of the fly-ball governor 69 which is responsive to the speed of the turbine 20 driving the second stage supercharger 9. The stator winding 89 of the speed transformer 81 is connected at one end through a conductor 91 in series with the stator winding 65 of the transformer 57, which is in turn connected through a conductor 93 to a stator winding 95 of a ram temperature responsive variable coupling transformer 97, the purpose of which will be explained hereinafter.

The stator winding 95 is connected by a conductor 99 with a stator winding 101 of a ram air inlet pressure responsive variable coupling transformer 103, the purpose of which will be explained hereinafter. The stator winding 101 is in turn connected through a conductor 105 with the stator winding 107 of a speed follow-up variable coupling transformer 113 which is in turn connected through a grounded conductor 115 to a grounded input 116 of an amplifier 117.

The other end of the winding 89 of the speed transformer 81 is connected through a conductor 119 to a stator winding 121 of an over-speed responsive transformer 123. The stator winding 121 is in turn connected through a conductor 125 to one end of the stator winding 127 of a steady state temperature reset transformer 129. The other end of the winding 127 is in turn connected by a conductor 131 to a contact 132 of a switch 133 which controls the connection of contact 132 with a second contact 134 connected through a conductor 135 to the input of the amplifier 117. The amplifier 117 may be of a conventional type or may be of a type such as shown in U. S. Patent No. 2,493,605 granted January 3, 1950 to Adolph Warsher and assigned to Bendix Aviation Corporation.

It will be seen then that there is provided a main control loop circuit for the amplifier 117 which includes the stator winding 65 of the speed selector transformer 57, stator winding 89 of the speed responsive transformer 81, stator winding 95 of the ram temperature responsive transformer 97, stator winding 101 of the ram pressure responsive transformer 103, stator winding 107 of the valve follow-up transformer 113, stator 121 of the overspeed responsive transformer 123 and stator winding 127 of the steady state temperature reset transformer 129.

The rotor winding 59 of the speed selector transformer 57 is arranged in relation to winding 65 so that the voltage induced from winding 59 into winding 65 will be 180 degrees out of phase with the voltage induced in winding 89 from the speed responsive winding 83. The magnitude of the voltage induced in winding 65 will be dependent upon the coupling relation between winding 59 and 65, while the magnitude of the voltage induced in winding 89 will be dependent upon the coupling relation between the winding 83 and 89 which is in turn dependent upon the speed of the turbine 20 driving the fly-ball governor 69 through shaft 27.

Under steady state operating conditions, when the voltage induced in winding 65 equals that induced in winding 89, no differential or error signal voltage will be applied across input lines 116 and 135.

However, upon the voltage induced in the speed responsive winding 89 exceeding that induced in the speed selector winding 65, a signal voltage may be applied across the lines 116 and 135 having a phase corresponding to that induced in the winding 89 and indicating a speed of the turbine 20 in excess of that selected by the position of the speed selector transformer rotor 59, while upon the voltage induced in the speed selector winding 65 exceeding that induced in the speed responsive winding 89 there may be applied to lines 116 and 135, a signal voltage having a phase corresponding to that induced in winding 65 and indicating a speed of the turbine 20 less than that selected by the position of the speed selector transformer rotor 59.

Output conductors 136 and 138 lead from the amplifier 117 to a magnetic amplifier 140 which may be of conventional type or of a type such as shown, for example, in the U. S. Patent No. 2,432,036 granted December 2, 1947 to Paul A. Noxon and assigned to Bendix Aviation Corporation.

Output conductors 142 and 144 lead from the magnetic amplifier 140 to the control winding of a reversible two phase actuator motor 146. The other winding of the motor 146 is connected by conductors 148 and 150 across the main source of alternating current. The motor 146 adjusts through a shaft 152 and linkage 154 a fuel throttling valve 156 which connects fuel conduits 16 and 158 and controls the fuel supplied to the combustion chamber 12 through conduit 16.

Thus, upon the speed of the turbine 20 decreasing below that for which the transformer 57 is set, a signal voltage is applied to the amplifier 117 and magnetic amplifier 140 and impressed across the motor control lines 142 and 144 of such a phase as to cause rotation of the shaft 152 and adjustment of the fuel throttling valve 156 in a direction to increase the supply of fuel to the combustion chamber 12 to in turn increase the speed of the turbine 20 to the selected value.

If the speed of the engine increases above that for which the transformer 57 is set, the signal voltage across lines 115 and 135 will have an opposite phase relation causing rotation of the motor 146 in an opposite direction to decrease the fuel supplied through throttling valve 156 and thereby decrease the speed of turbine 20 to the selected value. It will be seen then that the voltage of the speed selector transformer 57 bucks that of the speed transformer 81. The voltage of the speed responsive transformer 81 calls for less engine speed while the voltage of the speed selector transformer 57 calls for an increase in the speed of the engine.

The predominating signal voltage, of course, controls the action of the motor 146 and tends to maintain the speed selected through the transformer 57 by the position of the pilot's control lever 40.

In actual operation, the magnitude and phase of the signal voltage across the lines 115 and 135 is dependent not only on the relative relation of the speed selector transformer 57 and speed responsive transformer 81, but also upon the signal voltage induced in the serially connected stator windings of the valve position follow-up transformer 113; ram or compressor air inlet pressure responsive transformer 103; ram or compressor air inlet temperature responsive transformer 97; first stage low pressure supercharger over-speed responsive transformer 123; and the steady state temperature reset transformer 129, as will be explained hereinafter.

Speed follow-up

As shown in Figure 2, the motor 146, in addition to positioning the throttling valve 156 through shaft 152, also positions through shaft 161, as indicated by dotted lines, a rotor 163 of the speed follow-up transformer 113. The rotor 163 has a rotor winding 165 connected through conductors 166 and 168 to the main source of alternating current. The winding 165 is further inductively coupled to the stator winding 107 of the transformer 113. The winding 165 is arranged to induce in the winding 107 a voltage which is in phase with the voltage induced in the speed responsive winding 89 and 180 degrees out of phase with the voltage induced in the speed selector winding 65 so as to tend to add to the voltage induced in the winding 89 a follow-up voltage which decreases upon adjustment of the rotor 163 by the motor 146 in a valve closing direction decreasing fuel and turbine speed and tending to rebalance the differential or signal voltage across the lines 115 and 135 occurring upon an unbalanced relation between the differential transformers 57 and 81. Upon a call for increased fuel or engine speed, the rotor 163 is adjusted in an opposite valve opening direction and tends to increase the additive effect of the follow-up transformer 113 on the transformer 81 so as to effect a reverse follow-up action. The follow-up action aforenoted occurs instantaneously upon adjustment of the throttling valve 156 by the motor 146, to give a well damped speed control to the fuel throttling valve 156.

Ram or compressor air inlet pressure bias

The combustion chamber 12 requires more fuel to operate at constant temperature upon an increase in the ram or compressor air inlet pressure and, therefore, there is provided the transformer 103 to compensate for change in the ram air inlet pressure. Controlling the transformer 103 is a bellows 171 mounted in a sealed chamber 173 and to which is applied through the conductor 6 ram air inlet pressure.

The bellows 171 is operatively connected through suitable linkage 174 and shaft 175 to a rotor 177 of the ram pressure responsive transformer 103 so as to adjustably position the rotor 177 with changes in ram pressure to vary the selected speed setting so as to compensate for such change in pressure.

The rotor 177 has a rotor winding 179 connected through conductors 181 and 183 across the main source of alternating current. The winding 179 is further inductively coupled to the stator winding 101 of the transformer 103 and is arranged to induce in the winding 101 a voltage which is in phase with the voltage induced in the speed selector winding 65 and of a magnitude which increases with an increase in the ram or compressor air inlet pressure so as to in effect increase the speed setting of the turbine 20 so as to compensate for such increase in the ram air inlet pressure. Further, since less follow-up is required with increase in ram pressure, it will be seen that the latter signal voltage induced in the winding 101 acting in opposition to the follow-up signal voltage induced in winding 107 will tend to decrease the magnitude of the follow-up voltage with increase in ram air inlet pressure.

Of course, a decrease in the ram air inlet pressure has an opposite effect causing the bellows 171 to adjust the rotor 177 to decrease the speed setting of the turbine 20 and the fuel supplied the combustion chamber 12 so as to compensate for such decrease in the ram air inlet pressure.

Ram or compressor air inlet temperature bias

Moreover in order to operate the engine at a selected constant temperature upon an increase in the ram air inlet temperature which in turn effects a decrease in the density of the air supplied the engine, it is necessary that the speed of the engine be increased sufficiently to compensate for the resulting decrease in the density of the air by such increase in ram air inlet temperature.

There is thus provided in the main control loop the transformer 97 to compensate for changes in the ram or compressor air inlet temperature. Controlling the transformer 97 is a bellows 191 shown in Figure 3 and operated by a suitable fluid medium in the bellows 191, tube 33 and bulb 32 in response to changes in the ram air inlet temperature to vary the selected speed setting so as to compensate for change in the ram air inlet temperature.

The bellows 191 is operatively connected through suitable linkage 193 and shaft 195 to a rotor 197 of the ram air inlet temperature responsive transformer 97 so as to adjustably position the rotor 197 with change in ram air temperature to vary the selected speed setting so as to compensate for such change in air inlet temperature.

The rotor 197 has a rotor winding 201 connected through conductor 204 and 206 to the main source of alternating current. The winding 201 is further inductively coupled to the stator winding 95 in the main control loop and to a second stator winding 208 in the temperature control loop of Figure 3, as will be hereinafter explained. The winding 201 is arranged to induce in the winding 95 a voltage which is in phase with the voltage induced in the speed selector winding 65 and of a magnitude which increases with increase in the ram or compressor air inlet temperature so as to in effect increase the speed setting of the turbine 20 so as to compensate for such increase in the ram air inlet temperature.

Of course, a decrease in the ram or compressor air inlet temperature has an opposite effect on the bellows 191 to adjust the rotor 197 to decrease the speed setting of the turbine 20 so as to compensate for such decrease in the ram or compressor air inlet temperature.

Steady state temperature reset of the speed setting

A further reset action is effected through operation of the reset transformer 129 which includes a rotor 220 having a rotor winding 222 connected through conductors 224 and 226 and switch 48 across the main source of alternating current.

The winding 222 is inductively coupled to winding 127 so as to induce a signal voltage therein to vary the speed setting of the main control loop in the event the actual turbine inlet temperature does not correspond to the selected temperature of the temperature control loop of Figure 3, as hereinafter explained.

Figure 5:
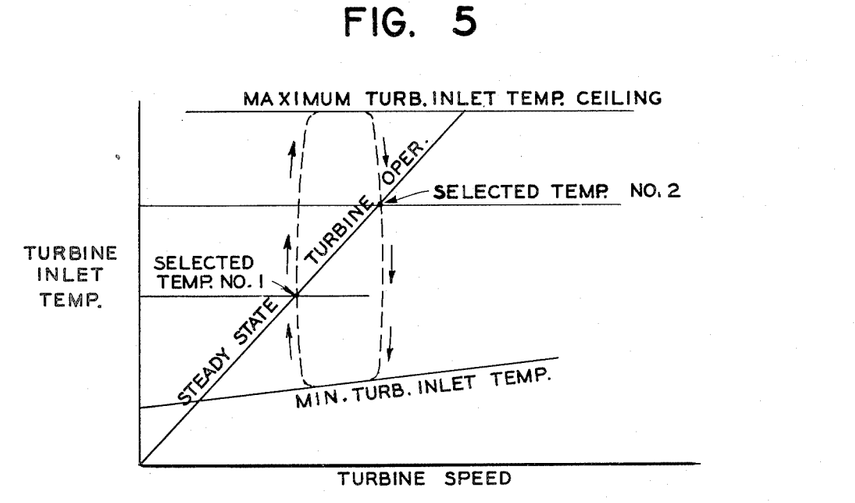
Figure 5 is a graph illustrating the operation of the control system on a turbine inlet temperature ceiling to effect an increase in selected speed and along a prescheduled minimum turbine inlet temperature to effect a decrease in selected temperature speed as indicated thereon by arrows and dotted lines.

Under steady state turbine operation, the turbine inlet temperature, as indicated graphically in Figure 5, should correspond to a predetermined value for the selected turbine speed.

Due to the biasing effect of the follow-up transformer 113; ram pressure responsive transformer 103 and ram temperature responsive transformer 97, the actual speed of the turbine 20 will not necessarily correspond to and may vary somewhat from the selected speed. Thus under steady state operation a turbine inlet temperature in excess of the predetermined value for the selected speed would indicate an actual turbine speed in excess of the selected value; while a turbine inlet temperature below the selected speed would indicate an actual turbine speed somewhat less than the selected speed. The transformer 129 is, therefore, provided to correct the actual speed of the turbine to the selected value, as determined by the turbine combustion gas inlet temperature responsive device 31.

The winding 222 is inductively coupled to winding 127 so as to induce a voltage therein of a phase which bucks the voltage in the follow-up winding 107 and of a magnitude which is increased or decreased dependent upon whether the actual turbine inlet temperature as determined by the temperature responsive circuit, as hereinafter explained, is less than or greater than the selected temperature so as to trim the speed setting of the main control circuit and the effective temperature to the selected value. A reset motor and gear train assembly 228 drives the rotor 220 through shaft 229 in a direction to slowly remove the error between the selected speed and actual speed as determined by the temperature responsive circuit, shown diagrammatically in Figure 3. The rotor 220 is relatively slowly adjusted by the motor 228 which may be of the conventional two-phase type having a winding connected through conductors 230 and 231 across the source of alternating current and a control winding connected by conductors 233 and 234 to the output of an amplifier 235. The reset amplifier 235 may be of conventional type or may be of a type such as shown and described in the aforesaid U. S. Patent No. 2,493,605.

Controlling input lines 236 and 238 leading to the amplifier 235 is the turbine inlet temperature responsive loop circuit shown in Figure 3 and including the winding 66 of the selector transformer 57, a thermocouple 31 and electronic rate circuit 250. The electronic rate circuit 250 may be of a conventional type including a demodulator, rate circuit and modulator or may be of a type such as disclosed in the copending application Serial No. 561,083 filed October 30, 1944 by Joel D. Peterson and assigned to Bendix Aviation Corporation.

As hereinafter explained, in the turbine temperature loop of Figure 3, the temperature is sensed by the thermocouple 31 and the temperature signal therefrom is amplified and converted to an A. C. signal by a magnetic amplifier 252 of conventional type connected across the main source of alternating current by lines 254 and 256 and having output lines 260 and 261. The electronic rate circuit 250 is connected across the output lines 260 and 261 and induces a signal in the winding 262, as hereinafter explained, proportional to the rate of change of the temperature and of a phase corresponding to the temperature signal so long as the temperature is increasing and of opposite phase so long as the temperature is decreasing.

The sum of these temperature and rate signals is balanced against a manually selected temperature signal induced in the winding 66 by the rotor winding 59 and acting in opposition to the temperature responsive signal applied to the output lines 260 and 261 of the magnetic amplifier 252 and any error signal is applied to the amplifier input conductors 236 and 238 to control the reversible electric actuator motor 228 so as to drive the rotor winding 222 of the steady state reset transformer 129 slowly in a direction to change the magnitude of the voltage induced in the winding 127 to in turn trim the speed setting to correct the error. The rotor winding 222 is rotated in a direction to increase voltage indicated in the winding 127 to increase the speed setting of the main control circuit upon the error signal being of the phase induced in the selector winding; but when the actual turbine inlet temperature is above the selected temperature, the error signal is of the opposite phase whereupon the motor 228 slowly drives the transformer rotor winding 222 in the opposite direction to decrease the voltage induced in the winding 127 to decrease the speed setting of the main control circuit thus trimming the speed setting of the main control circuit of Figure 2 to the actual selected value as determined by the actual turbine inlet temperature.

A high gear ratio between the actuator motor 228 and the rotor 220 of the reset transformer 129 is used to limit the maximum rate of change of the reset signal so as to prevent interference between the steady state temperature signal and the higher ceiling temperature desired during acceleration transients and the lower ceiling temperature desired during deceleration transients, as shown graphically in Figure 5 by dotted lines.

In this way, the turbine is allowed to accelerate or decelerate on a fixed ceiling temperature or scheduled minimum temperature until the selected speed is approached. At that time the selected speed signal may be trimmed by the small amount of temperature reset which has been cranked in during the speed transient and the main loop will be balanced so that motion of the fuel valve control motor 146 will be reversed on any further additional speed change. If the temperature circuit of Figure 3 is not then satisfied, the steady state temperature reset amplifier 235 will affect the control motor 228 so as to continue to slowly drive the variable coupling transformer 129 in the main control loop of Figure 2 in a direction to correct the turbine temperature to the selected value. Stabilization in the steady state temperature loop of Figure 3 is accomplished by means of the temperature rate circuit 250 which is adjusted to supply the required amount of anticipation of the response signal.

For operation below a predetermined speed or operational idle speed, a switch 48 may be mechanically actuated by the pilot's control lever 40 through a cam surface 46 to open the energizing circuit for and the connection from the source of alternating current to the steady state reset rotor winding 222 so as to transfer the main control loop to a straight speed responsive circuit with no temperature reset. At selected speeds above operational idle the cam surface 46 is adjusted by the pilot's control 40 in a counter-clockwise direction so as to permit spring arm contactor 271 to close contact 272 of the switch 48 so as to effect energization of the rotor winding 222.

Overspeed control

An electrical speed sense taken from the shaft 25 driving the low pressure or first stage supercharger 7 will limit the main control system to a maximum speed of a pre-selected value. This is affected through a shaft 29 driven from the shaft 25 by gearing 28 and connected to a flyball governor 275 of conventional type as shown in Figure 2. The governor 275 is mechanically connected to a rotary arm 277 arranged to impart rotary movement to shafts 279 and 280 upon changes in speed of the turbine 24. The shaft 280 is operably connected to a rotary element 282 of a variable coupling transformer 285, as shown in Figure 3, for affecting operation of the surge control mechanism, as will be explained hereinafter. The shaft 279, as shown in Figure 2, is operably connected to an arm 287 having a pin 289 arranged to engage a second arm 291 upon the driven speed of the shaft 29 exceeding a predetermined overspeed value. The arm 291 is connected through a shaft 293 to a rotor element 294. The rotor element 294 has a winding 295 thereon which winding is connected across the main source of alternating current and may be inductively coupled to the winding 121. The arm 291 is normally held by a spring 297 in contacting engagement with a stop pin 299. In the latter position of the arm 291 the winding 295 is positioned at right angles to the stator winding 121 and out of coupling relation therewith so that the signal induced thereby into winding 121 is normally zero. However, upon an over-speed condition prevailing, the arm 287 is adjusted in a clockwise direction so that the pin 289 engages the arm 291 and biases the arm 291 and rotor 294 in a corresponding clockwise direction so as to inductively couple the winding 295 to the winding 121 inducing a voltage into the winding 121 which is of the same phase as the voltage inducted in the speed responsive winding 89 and of a magnitude which increases rapidly for small overspeed values so as to override any opposing voltages induced in other windings of the main control circuit and to cause the fuel valve actuator motor 146 to move in a direction to decrease the fuel supplied to the nozzles of the combustion chamber 12 and thereby decrease the speed of the turbines 20 and 24 to within a predetermined safe range.

It will thus be seen that overspeeding is prevented by the separate speed sensing signal provided in the main control loop by the variable coupling transformer 123.

*Steady state temperature loop*

Referring to the drawing of Figure 3, the temperature responsive element 31 is shown as a thermocouple connected in a loop circuit including control windings 300 and 301 of the magnetic amplifier 252 which may be of conventional type. The magnetic amplifier 252 includes serially connected excitation windings 304 and 305 connected serially across the main source of constant frequency alternating current. The magnetic amplifier 252 also includes D. C. bias windings 306 and 307 and the control windings 308 and 309 inductively coupled to the excitation windings 304 and 305. The thermocouple 31 is connected across the windings 300 and 301 which are so arranged that the control signal energizing these windings will be proportional to the temperature of the combustion gases at the turbine inlet and such control signal will in turn vary through operation of the magnetic amplifier 252 the induced voltage in the control windings 308 and 309 in direct relation to such temperature so that the signal voltage affecting the output lines 260 and 261 of the magnetic amplifier 252 will vary in magnitude in direct relation with the turbine inlet temperature and will be of a phase calling for decrease in the turbine inlet temperature.

The output line 261 of the magnetic amplifier 252 is serially connected to the winding 262 which is in turn connected by a conductor 311 to one end of the temperature selector winding 66, the opposite end of which is connected by a conductor 313 to the input line 236 of the steady state temperature amplifier 235 subject to a biasing voltage of an opposite phase calling for increase in the turbine inlet temperature and induced through a transformer 315 and resistor 317 to avoid the zero point of the variable coupling transformer 57. The resistor 317 is made adjustable so that the biasing voltage may be set at the proper value. The output lines 260 and 261 of the magnetic amplifier 252 are also connected to the input of a temperature rate circuit indicated in Figure 3 by the numeral 250 and which may be of a conventional type including a demodulator, rate circuit and modulator or may be of a type such as disclosed in the acceleration responsive control circuit of the copending application Serial No. 561,083 filed October 30, 1944 by Joel D. Peterson and assigned to Bendix Aviation Corporation.

The temperature rate circuit is arranged to apply voltages of like magnitude and of opposite phase to windings 320 and 321, respectively, of transformer 323 so long as the temperature responsive control signal across the output lines 260 and 261 does not change. In the latter case the signals across the lines 320 and 321 are balanced and no signal voltage is induced thereby into the winding 262 inductively coupled thereto.

However, upon the turbine inlet temperature increasing causing the signal voltage across the lines 260 and 261 to correspondingly increase, a signal voltage is induced in the winding 321 which will dominate that in the winding 320 so that a signal voltage of a magnitude proportional to such change will be induced in the winding 262 of a like phase to that across the output lines 261 and 260 so as to tend to call for a decrease in temperature subject to the selector voltage of opposite phase induced in the temperature selector winding 66 and biased by transformer 315.

Similarly, upon the turbine inlet temperature decreasing causing the magnitude of the signal voltage across the lines 260 and 261 to correspondingly decrease, a signal voltage is induced in the winding 320 which will dominate that in the winding 321 and there will be induced in the winding 262 inductively coupled thereto, a voltage of a magnitude proportional to such decrease in temperature and of like phase to that of the biasing voltage of transformer 315 and opposite to that applied across the output lines 260 and 261. The latter rate signal voltage will tend to call for an increase in fuel subject to the temperature responsive voltage of opposite phase induced across the lines 260 and 261.

It will be seen then that the sum of these temperature and rate signals is balanced against the manually selected signal of the variable coupling transformer 57 and any error signal is then amplified to cause the actuator motor to drive the rotor 220 of the transformer 129 in a direction to reset the speed setting of the main control circuit so as to in turn control the fuel valve to correct such error signal, as heretofore indicated. Moreover, stabilization in the steady state temperature loop is accomplished by means of the temperature rate circuit 250 which is adjusted to supply the required amount of anticipation of the response signal.

*Stall Computer or Surge Limiter*

The stall region or turbine inlet temperature at which the compressor will surge is a function of compressor inlet temperature and compressor speed.

Under the invention in order to avoid the stall region of the compressor which varies with compressor inlet temperature and compressor speed, there has been devised a compressor inlet temperature sensing device and a compressor speed sensing device which varies the maximum permissible temperature so as to avoid stall conditions in accordance with a predetermined schedule. This schedule, of course, is dependent upon the characteristics of the particular engine to be controlled.

The schedules, generally, follow a given pattern so that as compressor inlet temperature increases, the temperature sensing device tends to increase the ceiling temperature or maximum permissible combustion chamber or turbine inlet temperature. However, as the speed of the compressor increases from idling to full throttle, the speed sensing device first tends to decrease the ceiling or maximum permissible temperature and then tends to increase the ceiling or maximum permissible temperature as full throttle is approached, as indicated graphically in Figure 6, in accordance with a predetermined schedule to avoid stall conditions of the engine.

The functions of the stall computer or surge limiting circuit are:

1. To compute the maximum permissible turbine inlet temperature which may be maintained without compressor surge.
2. Compare this computed temperature with the actual turbine inlet temperature.
3. To reduce fuel flow to prevent operation above this computed temperature without affecting the lower temperatures.

Figure 4:
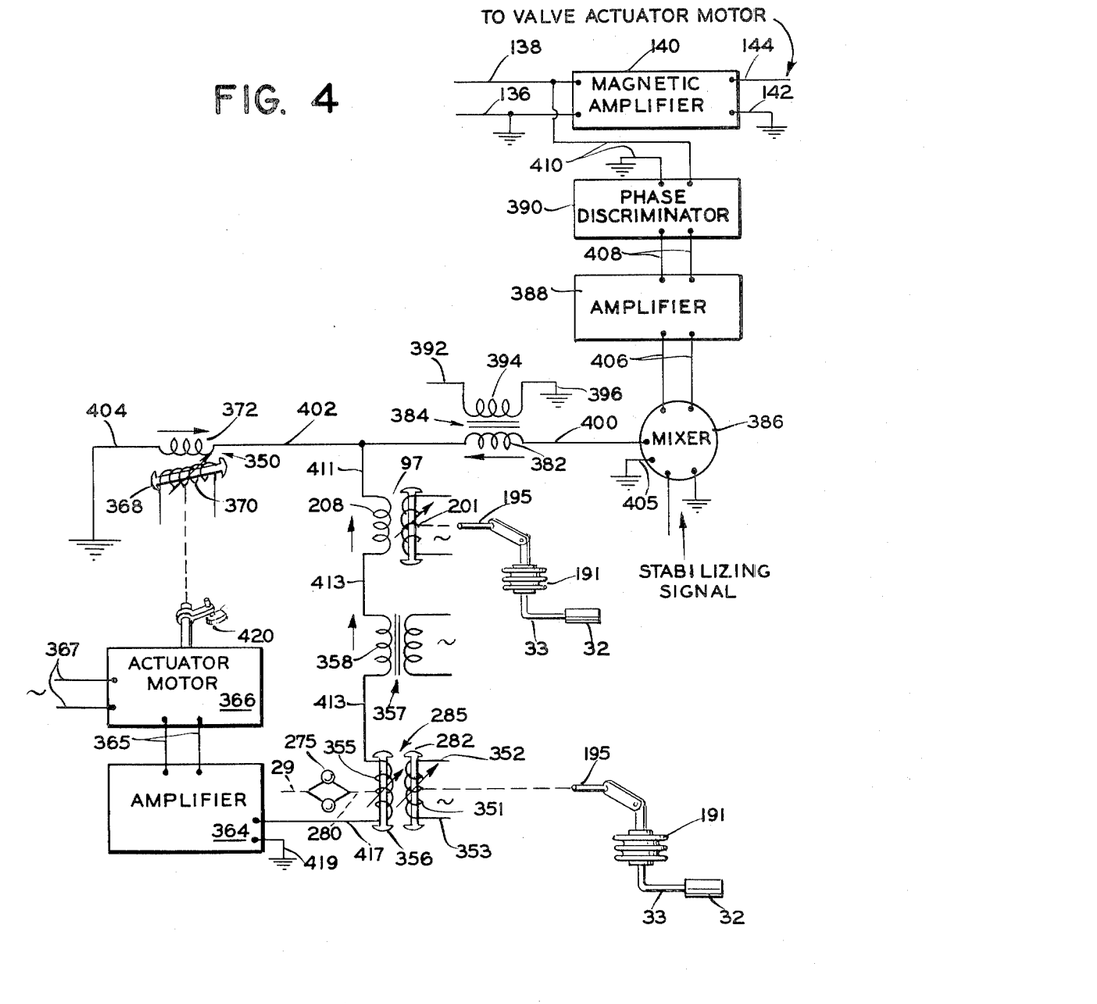
Figure 4 is a schematic diagram of the Stall Computer or Surge Limiter Circuit.
Figure 6:
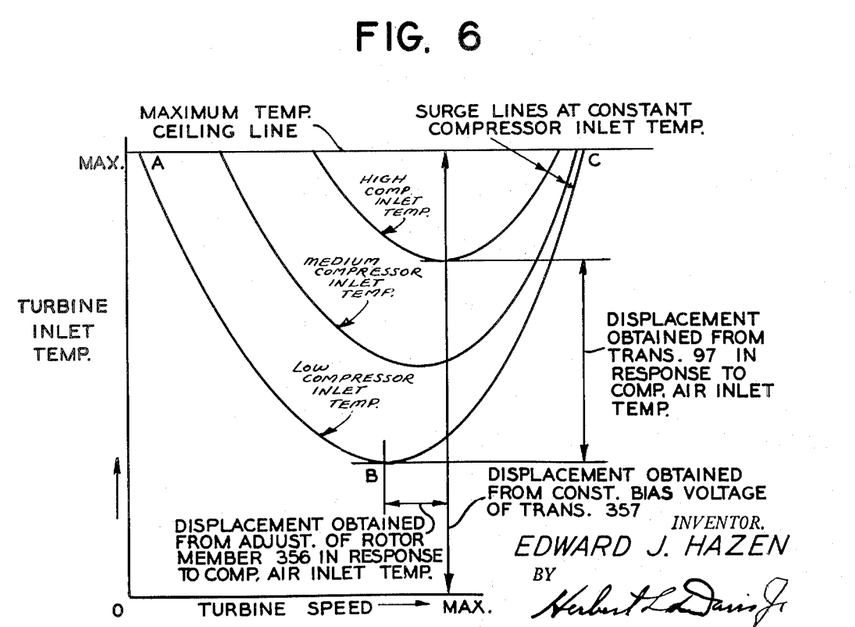
Figure 6 is a graph illustrating the operation of the Stall Computer or Surge Limiter.

Typical surge lines which this computer is designed to follow are shown graphically in Figure 6. A simplified diagram of the electrical computer circuit is shown in Figure 4 and its arrangement in the overall control system is illustrated in Figure 3.

This circuit consists of a servo loop for basically balancing the output of a computer variable coupling transformer 350 against a speed responsive fly-ball positioned variable coupling transformer 285 sensitive to the speed of the turbine 24. The transformer 285 has a rotor member 282 with a winding 351 thereon connected by conductors 352 and 353 across a main source of alternating current. A resistor 354 is adjustable for purposes of calibrating the transformer 285. Inductively coupled to the rotor winding 351 is a winding 355 mounted on a second rotor element 356. The rotor member 351 is adjusted relative to the rotor member 356 through the shaft 280 by the fly-ball governor 275 in response to the speed of the turbine 24 and in a clockwise direction, as indicated in the arrow on shaft 280 upon an increase in the speed of turbine 24.

The rotor winding 351 is arranged to induce in the winding 355 an output voltage which varies with the relative positions of the rotor members 282 and 356 from a maximum voltage of one phase to a maximum voltage of the opposite phase to a maximum voltage of the first phase to form a sinusoidal curve, as the rotor member is progressively adjusted from one extreme position to its opposite limit of adjustment by the fly-ball governor 275.

The variable coupling transformer 285 is so adjusted that the sinusoidal output voltage of the trasnformer 285 switches the curve ABC of the surge curves, shown graphically in Figure 6. The level of this speed output voltage is shifted to match the level of the actual temperature signal by means of a constant biasing voltage of opposite phase to that of the transformer 350, which biasing voltage is provided through a transformer 357 having a primary winding 358 connected across the main source of constant frequency alternating current and a secondary winding 359 connected across a calibrating resistor 360.

The biasing voltage dominates the output voltage of the transformer 285 so as to provide with changes in the speed of the turbine 24 over the operating range a resultant signal voltage of opposite phase to the output voltage of the transformer 350 and the magnitude of which follows the curve ABC of Figure 6.

A study of the curves ABC of Figure 6 will show that the maximum temperature ceiling for the particular engine under consideration must shift vertically along the turbine inlet temperature scale with increase in compressor air inlet temperature as well as laterally to the right along the turbine speed scale with such increase in the compressor air inlet temperature.

In order, therefore, to affect such shift in the basic curve ABC of Figure 6 vertically on the turbine inlet temperature scale with variations in compressor air inlet temperature another signal obtained from the transformer 97 having the rotor winding 201 positioned by the temperature responsive bellows 191 so that the voltage induced in the stator winding 208 is proportional to compressor inlet temperature which signal voltage is added to the servo loop. The voltage induced in the winding 208 by the winding 201 is of the same phase as the biasing voltage of transformer 357 and the magnitude of this voltage increases with the compressor inlet temperature.

The displacement of the curves along the speed scale is achieved by positioning the rotor member 356 of the transformer 285 relative to the rotor member 282 in response to compressor inlet temperature so that as compressor inlet temperature increases the rotor member 356 is adjusted in a clockwise direction, as indicated by the arrow on shaft 195, tending thereby to follow any adjustment of the rotor member 282 in a clockwise direction upon an increase in the speed of turbine 24 so as to in turn effect the lateral shift of the curve ABC of Figure 6.

An error signal from the computer loop circuit including transformer 350, transformer 97; transformer 357 and transformer 285 is applied to the input of a computer amplifier 364 which controls through output lines 365 the control winding of a two phase reversible motor 366 of conventional type. The other phase of the motor 366 is connected by lines 367 across the main source of alternating current.

The amplifier 364 may be of a conventional type or may be of a type such as shown in the aforesaid U. S. Patent No. 2,493,605.

The reversible motor 366 controls the position of a rotor 368 of transformer 350 through a shaft 369. The rotor 368 has a winding 370 thereon connected across the main source of alternating current and inductively coupled to the stator winding 372 of the transformer 350. Conductors 373 and 374 connect the winding 370 to the source of alternating current through a resistor 375 which may be adjusted for purposes of calibrating the transformer 350.

The winding 370 is arranged to induce a voltage in the stator winding 372 of a phase opposite to that of the output of the biasing transformer 357 and of a magnitude which varies with the relative position or coupling relation of the rotor winding 370 to the stator winding 372.

When the error signal from the computer loop circuit has a phase corresponding to that induced in the winding 372 by the winding 370, such error signal applied through the amplifier 364 to the control winding of the motor 366 will cause rotation of the motor 366 in a direction for decreasing the coupling relation between the windings 370 and 372 until the output across the winding 372 just balances the sum of the electrical signals from the transformer 97; transformer 357 and transformer 285. An error signal having an opposite phase will cause the motor 366 to rotate the winding 370 in the opposite direction to increase the signal voltage until the output across winding 372 balances the sum of the electrical signals from transformer 97; transformer 357 and transformer 285.

The computer output voltage across the winding 370 is further compared with the actual temperature signal applied to winding 382 of a transformer 384 and the difference or error is mixed with a stabilizing signal at a mixer circuit 386 (from a follow-up and reset circuit) and applied through a ceiling amplifier 388 to a phase discriminator 390.

Since over and under temperature error signals are of opposite phase the discriminator 390 is made to block all under temperature signals so that they have no effect on the main control circuit, but over temperature signals will pass through the discriminator 390 and reach the output stage of the main circuit so as to override the main circuit and reduce fuel flow until the computed safe temperature is reached. The action of this circuit is instantaneous and will limit temperature during transients and steady state operation at any position of the pilot's selected lever 40 and at all ambient conditions.

Now describing the Stall Computer or Surge Limiter Circuit in greater detail, a line 392 leads from the line 311 of the actual temperature responsive circuit to a primary winding 394 of the transformer 384. The opposite end of the winding 394 is grounded at 396. The winding 394 is inductively coupled to the secondary winding 382 of the transformer 384 and induces therein a voltage of a magnitude proportional to and which increases with the turbine inlet temperature sensed by the thermocouple 31 and of a phase opposite to that of the phase induced in the stator winding 372 of the computer transformer 350. One side of the winding 382 is connected by a conductor 400 to the input of the mixer circuit 386, while the other side of the winding 382 is connected by a conductor 402 to the winding 372. The opposite side of the winding 372 is ground-connected by a conductor 404. A like grounded input conductor 405 leads to the mixer circuit 386. The mixer circuit 386 may be of a conventional type or may be of a type such as described in the copending application Serial No. 156,260 filed April 17, 1950 by William E. Brandau and assigned to Bendix Aviation Corporation.

It will be seen then that upon the voltage induced in the windings 382 and 372 being unbalanced, a signal voltage will be applied to the input of the mixer circuit 386 and through the mixer circuit to output lines 406 of the mixer circuit 386 leading to the input of the temperature ceiling amplifier 389. The amplifier 388 may be of a conventional type or may be of a type such as shown in the aforesaid U. S. Patent 2,493,605. Output conductors 408 lead from the temperature ceiling amplifier 388 to a phase discriminator 390. The phase discriminator 390 may be of a conventional type or of a type disclosed in copending application Serial No. 41,329 filed July 29, 1948 by William E. Brandau and assigned to Bendix Aviation Corporation. The phase discriminator 390 is so designed as to permit the passage of a signal voltage to the output lines 410 of a phase corresponding to that induced in the winding 382 and indicative of a turbine inlet temperature condition in excess of that computed by the computer transformer 350, while preventing the passage of a signal voltage of an opposite phase or of a phase corresponding to that induced in the winding 372 and indicative of an under temperature condition.

Thus, a signal voltage calling for more fuel or temperature will be blocked out through action of the phase discriminator 390, while a signal voltage calling for a decrease in fuel or temperature upon the turbine inlet temperature being in excess of that selected through adjustment of the transformer 350 may be passed through the phase discriminator 390 to output lines 410 which in turn lead to the input of the magnetic amplifier 140. The latter signal voltage serving to affect the valve control motor 146 so as to decrease the fuel and temperature of the engine is of sufficient magnitude as to override any signal voltage from the speed responsive amplifier 117 calling for the opening of the valve 156 to supply more fuel to increase the speed and temperature of the engine.

The servo loop for controlling the computer transformer 350 includes conductor 411 leading from the winding 372 to the stator winding 208 of the temperature responsive transformer 97. Rotor winding 201 is inductively coupled to the winding 208 and adjustably positioned relative thereto by the turbine inlet temperature responsive bellows 191 through shaft 195. The winding 208 is in turn connected by a conductor 413 through resistor 415 and resistor 360 to the rotor winding 355 of the transformer 285. The resistor 360 is adjustable to vary the biasing effect of the transformer 357, while the resistor 415 may be adjusted to vary the output of winding 208. A further conductor 417 leads from the rotor winding 355 to the input of the amplifier 364. A second amplifier input conductor 419 is ground-connected and thus connected back to the conductor 404 of the computer transformer 350.

The line 413 is further subject to a biasing voltage applied by the transformer 357 so that the level of the speed output voltage is shifted to match the level of the actual temperature signal as heretofore explained. The rotor winding 351 is adjustably positioned by the speed responsive fly-ball mechanism 275 through shaft 280, while the rotor winding 355 of the transformer 285 is adjustably positioned by the shaft 195 of the temperature responsive device 191 which is indicated by dotted lines in Figure 3. The sum of the voltages induced in the windings 208, 359 and 361 provides a signal voltage of opposite phase to the signal voltage induced in the computer transformer winding 372 and the magnitude of the voltage induced in the windings 208 and 355 may be varied in accordance with the relative position of the windings with reference to the windings 201 and 351. The position of the winding 201 relative to the winding 208 is varied by the turbine inlet temperature responsive bellows 191, while the relative position of the winding 351 with respect to the winding 355 may be varied by the turbine speed responsive mechanism 275 and also by the temperature responsive bellows mechanism 191. Thus by suitable adjustment of the surge computer as described, the maximum permissible temperature may be made to vary so as to give the desirable characteristics indicated graphically in Figure 6.

A fixed maximum temperature ceiling is imposed on the surge curves by simply limiting the maximum adjustment of the rotor of the computer transformer 350 with a mechanical stop 420 to limit the rotation of rotor 368 and thereby the maximum permissible temperature which it may compute.

*Minimum turbine temperature*

Minimum inlet turbine temperature is controlled by a separate loop which compares the actual temperature signal with a reference signal. The error signal again is fed through a phase discriminator, but in this case over temperature signals are blocked and under temperature error signals are passed through to cause the opening of the fuel valve and maintenance of the scheduled minimum turbine operating temperature. The reference signal is obtained from the transformer 82 having a rotor element 80 which is positioned though the shaft 77 by the fly-ball governor 69 proportional to the speed of the high pressure or second stage supercharger 9. In this way, minimum operating temperature may be varied with unit speed as required.

Describing this minimum temperature control loop in greater detail a conductor 46 leads from the conductor 311 to a stator winding 427 of the transformer 82 and in turn through a conductor 428 to the input of a mixer circuit 430.

The stator winding 427 has inductively coupled thereto a rotor winding 429 mounted on the rotor 80. The rotor winding 429 is connected by conductors 430, 431 and resistor 432 across the main source of alternating current. The resistor element 432 is made adjustable for purposes of calibrating the transformer 82.

The input conductor 428 leading to the mixer circuit 430 is subject to a biasing voltage applied through a transformer 433 and resistor 434 of opposite phase to the voltage applied at the output of the temperature responsive magnetic amplifier 252. The latter biasing voltage shifts the output curve of the transformer 82 so as to avoid the zero point and the biasing voltage is such that the algebraic sum of the biasing voltage and output voltage of the transformer 82 provides a resultant signal voltage of the phase of the biasing voltage and a voltage which progressively increases with increase in the speed of the turbine 20 and which resultant voltage opposes the voltage from the turbine inlet temperature responsive magnetic amplifier 252. The difference or error voltage is applied to the input of the mixer circuit 430 through input conductor 428 and a second grounded input line 436.

The mixer circuit 430 may be of a conventional type or may be of a type such as disclosed in copending application Serial No. 156,260, filed April 17, 1950 by William E. Brandau and assigned to Bendix Aviation Corporation.

Output lines 438 lead from the mixer circuit 430 to a minimum temperature amplifier 440. The amplifier 440 may be of a conventional type or may be of a type such as shown in the aforesaid U. S. Patent No. 2,493,605.

Output conductor 442 leads from the minimum temperature amplifier 440 to a phase discriminator 444 which may be of a conventional type or of a type disclosed in copending application Serial No. 41,329, filed July 29, 1948 by William E. Brandau and assigned to Bendix Aviation Corporation.

The phase discriminator 444 is so designed as to permit the passage of a signal voltage to output lines 445 of a phase corresponding to that of the biasing voltage of the transformer 433 and indicative of a turbine inlet temperature condition below that set by the transformer 82, while preventing the passage of a signal voltage of an opposite phase or of a phase corresponding to that from the magnetic amplifier 352 and indicative of a temperature condition above the minimum temperature for which the transformer 82 is set.

The low temperature signal is then applied through conductors 410 and 138 and ground conductor 136 to the input of the magnetic amplifier 140 so as to cause adjustment of the actuator motor 146 in a direction for opening the fuel control valve 156 so as to increase the turbine inlet temperature above the minimum set by the transformer 82. Since the rotor element 80 is adjustably positioned by the fly ball 69 in response to the speed of the turbine 20, the minimum operating temperatures, as indicated graphically in Figure 5, may be varied with the speed of the turbine 20 as required.

Temperature follow-up and reset circuit

The follow-up winding 107 is arranged to apply not only a follow-up signal to the main control circuit as heretofore explained, but also a follow-up signal to the minimum and maximum temperature circuits through the mixer circuits 386 and 430 so as to prevent either the minimum or maximum temperature signal from effecting an overshooting adjustment of the fuel valve actuator motor 146. The follow-up signal is applied to the respective minimum and maximum temperature loop circuits through a conductor 450 leading from the conductor 99 as shown in Figure 2 through a calibrating resistor element 451, as shown in Figure 3, through a temperature reset winding 453 to an input conductor 455 leading to inputs of the respective mixer circuits 386 and 430. A second grounded conductor 457 leads to the input of the mixer system 386 while a grounded conductor 459 leads to the input of the mixer circuit 430.

It will be seen then that upon adjustment of the fuel valve actuator motor 146 in response to a minimum or maximum temperature signal from the respective temperature loop circuits, the rotor winding 165 of the transformer 113 will be adjusted in a direction so as to apply to the inputs of the effective mixer circuit 386 or 430 a follow-up voltage which will tend with change in position of the motor 146 to decrease the magnitude of the maximum or minimum temperature signal whichever may be effective so as to prevent overshooting in the adjustment of the fuel valve 156.

The temperature reset transformer 465 has a rotor element 467 with winding 469 thereon inductively coupled to the stator reset winding 453. The winding 469 is connected through conductors 471 and 472 across the main source of alternating current and there is further provided an adjustable resistor element 475 for adjusting the calibration of the transformer 465.

The rotor element 467 is adjustably positioned through a shaft 477 by an actuator motor 479 which may be of a two phase type. One of the windings of the motor 479 is connected across the main source of alternating current through conductors 481, while the control winding of the motor 479 is connected through conductor 483 to the output of amplifier 485. Conductor 487 leads from the conductor 455 to the input of the amplifier 485, while a grounded conductor 487 leads to the other input of the amplifier 485. Amplifier 485 may be of a conventional type or may be of a type such as shown in the aforesaid U. S. Patent No. 2,493,605.

The rotor winding 469 of the transformer 465 is arranged to induce the stator winding 453 a voltage which is in phase opposition to the voltage induced in the follow-up winding 107 and is of a magnitude which varies with the coupling relation between the windings 453 and 469.

Upon the follow-up voltage of the winding 107 exceeding the reset voltage in the winding 453 the differential error signal of a phase corresponding to that induced in the follow-up winding 107 will cause the actuator motor 479 to adjust the motor element 467 in a direction to increase the voltage induced in the winding 453 so as to slowly wipe out the follow-up effect of the winding 107. However, upon the voltage induced in the temperature reset winding 453 exceeding that induced in the follow-up winding 107 the phase of the differential or error signal corresponding to that induced in the winding 453 will be such as to cause actuator motor 479 to rotate in an opposite direction causing the rotor element 467 to be rotated in a direction so as to slowly decrease the signal voltage induced in the winding 453 so as to in turn balance the follow-up signal in winding 107.

It will be seen then that the follow-up signal of the winding 107 affects not only the maximum temperature signal applied through the mixer circuit 386, but will also provide a follow-up effect on any minimum temperature signal which may be applied through the mixer system 430, thus providing stability of control under either maximum or minimum temperature conditions.

Further since less follow-up is required with increase in ram pressure it will be seen that the signal voltage induced in the winding 101 by the transformer 103 and acting in opposition to the follow-up signal voltage induced in winding 107 will tend to decrease the magnitude of the follow-up voltage with increase in ram air inlet pressure so as to compensate the follow-up for such change in ram pressure.

Speed sensitive inter-lock switch

Adjustment of the pilot's control lever 40 to the position shown in Figure 2 will cause actuation through cam surface 45 of the switch element 50 so as to close through conductor 490 an energizing circuit for a relay winding 491 which actuates the relay switch 133 to the position shown to close contacts 492 and 493. The closing of contacts 492 and 493 by the relay switch 133 connects to the input of the amplifier 117 a secondary winding 493 of a transformer 494. Primary winding 495 of the transformer 494 is connected across the main source of alternating current and is arranged to induce into the secondary winding 493 a signal voltage of a phase which when applied to the input of the amplifier 117 causes the actuator motor 146 to be driven in a direction for fully closing the fuel valve 156. Thus adjustment of the pilot's control lever 40 to the position shown closing spring contactors 495 and 496 of the switch 50 to effect a complete shut down of the engine.

There is further provided a speed sensitive interlock switch 500 mounted on the shaft 77 and adjustably positioned by the fly-ball governor 69 so as to maintain the energizing circuit for the electromagnetic winding 491 closed at all speeds below a predetermined minimum speed for starting the engine. Thus in starting of the engine when the control 40 is adjusted so as to permit spring contacts 495 and 496 of switch 50 to open, the control still remains in the cut-off position until the speed of the turbine 20 has been increased to the predetermined minimum speed sufficient to affect starting operation of the engine at which speed the insulated land 501 of the inter-lock switch 500 is rotated by the shaft 77 to a position to open the energizing circuit for the electromagnetic winding 491 causing the relay switch 133 to be moved to the position indicated by dotted lines under the biasing force of a spring 505.

Although only one embodiment of the invention has been illustrated and described, various changes in the form and relative arrangements of the parts may be made to suit requirements.

What is claimed is:

1. For use in determining the maximum permissible operating temperature for an aircraft engine having fuel and air intakes, a combustion chamber and turbine driven by the exhaust gases from said chamber; a control mechanism of the type including first means for deriving a first control voltage responsive to the speed of said turbine, second means for deriving a second control voltage responsive to the temperature of said air intake, and means for integrating said voltages to obtain a third control voltage proportional to said maximum permissible operating temperature; the improvement comprising said first means including a first rotor winding, a second rotor winding inductively coupled thereto induce in said first rotor winding said first control voltage, turbine speed responsive means to adjustably position one of said rotor windings relative to the other rotor winding to vary said first control voltage with changes in turbine speed, and air intake temperature responsive means to adjustably position the other of said rotor windings relative to said one winding to vary said first control voltage with changes in air intake temperature.

2. For use with an aircraft engine having a combustion chamber, an air inlet to said chamber, and a turbine driven by the exhaust gases from said chamber; the combination comprising adjustably positioned means for controlling the supply of fuel to said combustion chamber, means for regulating the position of said fuel control means, a turbine speed responsive device, means operated by said device to control said regulating means in response to the speed of said turbine and to maintain through said regulating means a predetermined turbine speed, a reset means including a relatively slowly operative means to vary said predetermined turbine speed, an element responsive to the temperature of the combustion chamber gas to operate said reset means so as to maintain through said regulating means a predetermined combustion chamber gas temperature, pilot operated means for selecting said predetermined speed and temperature, limiting means controlled by the gas temperature responsive element for causing the regulating means to affect the fuel control means so as to increase the supply of fuel to the combustion chamber upon the temperature of said gas decreasing below a predetermined minimum temperature as during deceleration of said turbine.

3. The combination defined by claim 2 including limiting means controlled by the combustion gas temperature responsive element for overriding the speed and temperature regulating means upon the temperature of said gas either exceeding a predetermined maximum as during acceleration of said turbine or decreasing below a predetermined minimum temperature as during deceleration of said turbine so as to maintain the temperature of said gas within said maximum and minimum temperatures.

4. For use with an aircraft engine having a combustion chamber, an air intake to said chamber, and a turbine driven by the exhaust gases from said chamber; the combination comprising means for controlling a supply of fuel to said combustion chamber, a speed responsive device to regulate said fuel control means in response to the speed of said turbine and to maintain through said fuel control means a predetermined turbine speed, a minimum combustion chamber gas temperature responsive means for overriding said speed responsive device, means effective upon said gas temperature decreasing below a predetermined minimum as during deceleration of said engine to operatively connect said combustion gas temperature responsive means to control said fuel control means so as to maintain the combustion gas temperature in excess of said predetermined minimum, and means for selecting said predetermined minimum temperature in accordance with turbine speed.

5. For use with an aircraft engine having a combustion chamber, an air inlet to said chamber, and a turbine driven by the exhaust gases from said chamber; the combination comprising means for controlling a supply of fuel to said combustion chamber, a speed responsive device to regulate said fuel control means in response to the speed of said turbine and to maintain through said fuel control means a predetermined turbine speed, a minimum combustion chamber gas temperature responsive means for overriding said speed responsive device, means effective upon said gas temperature decreasing below a predetermined minimum as during deceleration of said engine to operatively connect said combustion gas temperature responsive means to control said fuel control means so as to maintain the combustion gas temperature in excess of said predetermined minimum, manually operable means for selecting said predetermined turbine speed, and means for selecting said predetermined minimum temperature in accordance with turbine speed.

6. For use with an aircraft engine having a combustion chamber, a ram air intake to said chamber, and a turbine driven by the exhaust gases from said chamber; the combination comprising adjustably positioned means for controlling supply of fuel to said combustion chamber, means for regulating the position of said fuel control means, a speed responsive device to control said second mentioned means in response to the speed of said turbine and to maintain through said second mentioned means a predetermined turbine speed, follow-up means responsive to a change of position of said fuel control means for affecting said regulating means so as to vary said predetermined turbine speed to temporarily inhibit further change of position of said fuel control means, combustion chamber gas temperature responsive means, ram air condition responsive means for affecting said regulating means so as to vary said predetermined turbine speed with change in said condition, and a reset means including a relatively slowly operating means controlled by said temperature responsive means for affecting said regulating means so as to gradually offset the effect of said follow-up and ram air condition responsive means in direct response to the temperature of the combustion chamber gas.

7. The combination defined by claim 6 in which said condition responsive means includes a device responsive to the ram air pressure.

8. The combination defined by claim 6 in which said condition responsive means includes a device responsive to the ram air temperature.

9. For use in determining the maximum permissible operating temperature for an aircraft engine having fuel and air intakes, a combustion chamber, and a turbine driven by the exhaust gases from said chamber; a control mechanism comprising first means for deriving a first control voltage in response to the temperature of said air intake, turbine speed sensing means, an inductive coupling device to derive a second control voltage, said device actuated by said turbine speed sensing means to vary said second control voltage with changes in said speed, air inlet temperature sensing means to actuate said device so as to vary said second control voltage with changes in the air inlet temperature, means for integrating said voltages to obtain a third control voltage proportional to maximum permissible operating temperature.

10. For use with an aircraft engine having a combustion chamber, and an air inlet to said chamber; the combination comprising adjustably positioned means for controlling the supply of fuel to said combustion chamber, means for regulating the position of said fuel control means, an engine speed responsive device to control said second mentioned means and to maintain through said second mentioned means a selected engine speed, air inlet condition responsive means to vary said selected speed, a reset means including a relatively slowly operating means to vary said selected engine speed, and means responsive to the temperature of the combustion chamber gas to control said reset means so as to maintain through said second mentioned means a selected combustion chamber gas temperature.

11. The combination defined by claim 10 including a manually operable means for simultaneously varying said selected engine speed and combustion chamber gas temperature.

12. The combination defined by claim 10 including combustion chamber gas temperature responsive means for overriding said speed and temperature regulating means to affect a decrease in fuel upon the temperature of said gas exceeding a predetermined maximum as during acceleration of said engine.

13. The combination defined by claim 10 including combustion chamber gas temperature responsive means for overriding said speed and temperature regulating means to affect an increase in fuel upon the temperature of said gas decreasing below the predetermined minimum as during deceleration of said engine.

14. The combination defined by claim 10 including air inlet temperature responsive means for varying the selected speed in direct relation to the air inlet temperature.

15. The combination defined by claim 10 including an air inlet pressure responsive means for varying the selected speed in direct relation to the air inlet pressure.

16. The combination defined by claim 10 including a manual control means for simultaneously varying said selected engine speed and combustion chamber gas temperature, and means operable by said manual control means for transferring said reset means from an operative to an inoperative relation upon adjustment of said manual control means to within a predetermined engine idling range.

17. For use with an aircraft engine having a combustion chamber; the combination comprising adjustably positioned means for controlling the supply of fuel to said combustion chamber, means for regulating the position of said fuel control means, and an engine speed responsive device to control said second means and to maintain through said second mentioned means a selected engine speed, a reset means including a relatively slowly operating means to vary said selected engine speed, means responsive to the temperature of the combustion chamber gas to control said reset means so as to maintain through said second mentioned means a selected combustion chamber gas temperature, and manually operable means for transferring said reset means from an operative to an inoperative relation.

18. For use with an aircraft engine having a combustion chamber, an air inlet to said chamber, and a first and a second turbine driven by the exhaust gases from said chamber; the combination comprising adjustably positioned means for controlling the supply of fuel to said combustion chamber, means for regulating the position of said fuel control means, a first turbine speed responsive device, means operated by said device to control said regulating means in response to the speed of said first turbine and to maintain through said regulating means a predetermined first turbine speed, a reset means including a relatively slowly operating means to vary said predetermined first turbine speed, an element responsive to the temperature of the combustion chamber gas to operate said reset means so as to maintain through said regulating means a predetermined combustion chamber gas temperature, pilot operated means for selecting said predetermined speed and temperature, limiting means controlled by the gas temperature responsive element for causing the regulating means to affect the fuel control means so as to increase the supply of fuel to the combustion chamber upon the temperature of said gas decreasing below a predetermined minimum temperature as during deceleration of said first turbine, second means operated by said first turbine speed responsive device to vary said predetermined minimum temperature, a control mechanism for determining the maximum permissible temperature of the combustion gases including a second turbine speed responsive means and an air inlet temperature responsive means, and means controlled by the combustion chamber gas temperature responsive element and said control mechanism for causing the regulating means to affect the fuel control means so as to decrease the supply of fuel to the combustion chamber upon the temperature of the gas exceeding said maximum permissible temperature as during acceleration of said second turbine.

19. For use with an aircraft engine having a combustion chamber, a ram air intake to said chamber, a fuel inlet to said chamber, a first turbine and a second turbine driven by the exhaust gases from said chamber; the combination comprising adjustably positioned means for controlling the supply of fuel to said combustion chamber through said fuel inlet, means for regulating the position of said fuel control means, a first turbine speed responsive device, means operated by said device to control said regulating means in response to the speed of said first turbine and to maintain through said regulating means a predetermined first turbine speed, follow-up means responsive to change the position of said fuel control means for affecting said regulating means so as to vary said predetermined first turbine speed to temporarily inhibit further change of position of said fuel control means, ram air condition responsive means for affecting said regulating means so as to vary said predetermined first turbine speed with change in said condition, a reset means including a relatively slowly operating means to vary said predetermined first turbine speed, an element responsive to the temperature of the combustion chamber gas to operate said reset means so as to maintain through said regulating means a predetermined combustion gas temperature, pilot operated control means for simultaneously selecting said predetermined first turbine speed and predetermined gas temperature, an additional means operable by said pilot operated means for transferring said reset means from an operative to an inoperative relation upon adjustment of said control means to within a predetermined engine idling range, limiting means controlled by the gas temperature responsive element for causing the regulating means to affect the fuel control means so as to increase the supply of fuel to the combustion chamber upon the temperature of said gas decreasing below a predetermined minimum temperature as during deceleration of the first turbine, second means operated by said first turbine speed responsive device to vary said predetermined minimum temperature, a control mechanism for determining the maximum permissible temperature of the combustion gases including a second turbine speed responsive means and an air inlet temperature responsive means, and means controlled by the combustion chamber gas temperature responsive element and said control mechanism for causing the regulating means to affect the fuel control means so as to decrease the supply of fuel to the combustion chamber upon the temperature of the gas exceeding said maximum permissible temperature as during acceleration of said second turbine.

20. In an engine control mechanism of the type including means for regulating fuel to said engine, and engine speed responsive means for controlling said regulating means to maintain a predetermined engine speed; the improvement comprising engine air inlet condition responsive means for changing said predetermined engine speed in one sense, engine temperature responsive means for changing said predetermined engine speed in an opposite sense to approximate a predetermined engine speed and temperature, manually operable means for selecting said predetermined engine speed and temperature, and additional means controlled by said manually operable means for discontinuing operation of said temperature responsive means.

References Cited in the file of this patent

UNITED STATES PATENTS

| | | |
|---|---|---|
| 2,336,052 | Anderson | Dec. 7, 1943 |
| 2,350,781 | Lichte | June 6, 1944 |
| 2,479,813 | Chamberlin et al. | Aug. 23, 1949 |
| 2,510,753 | Multhaup | June 6, 1950 |
| 2,558,592 | Starkey et al. | June 26, 1951 |
| 2,568,127 | May et al. | Sept. 18, 1951 |
| 2,606,420 | Moore | Aug. 12, 1952 |
| 2,644,300 | Waterman et al. | July 7, 1953 |

FOREIGN PATENTS

| | | |
|---|---|---|
| 620,161 | Great Britain | Mar. 21, 1949 |